(12) United States Patent
Mishra et al.

(10) Patent No.: US 9,912,163 B2
(45) Date of Patent: Mar. 6, 2018

(54) POWER QUALITY ISSUE MITIGATION THROUGH HYBRID GRID

(71) Applicant: PHILIPS LIGHTING HOLDING B.V., Eindhoven (NL)

(72) Inventors: Priya Ranjan Mishra, Bangalore (IN); Rakeshbabu Panguloori, Bangalore (IN); Arup Dalal, Eindhoven (NL); Sagar Goel, Haldwani (IN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 183 days.

(21) Appl. No.: 14/649,784

(22) PCT Filed: Nov. 19, 2013

(86) PCT No.: PCT/IB2013/060241
§ 371 (c)(1),
(2) Date: Jun. 4, 2015

(87) PCT Pub. No.: WO2014/087286
PCT Pub. Date: Jun. 12, 2014

(65) Prior Publication Data
US 2016/0372930 A1    Dec. 22, 2016

(30) Foreign Application Priority Data

Dec. 4, 2012    (IN) .......................... 5048/CHE/2012

(51) Int. Cl.
*H02J 3/46*    (2006.01)
*H02J 3/00*    (2006.01)
(Continued)

(52) U.S. Cl.
CPC ...... *H02J 3/46* (2013.01); *H02J 1/00* (2013.01); *H02J 3/00* (2013.01); *H02J 3/06* (2013.01);
(Continued)

(58) Field of Classification Search
CPC ...... H02J 3/46; H02J 3/06; H02J 3/383; H02J 1/00; H02J 3/00; H02J 3/38; H02M 7/5387; Y02B 10/14
See application file for complete search history.

(56) References Cited

U.S. PATENT DOCUMENTS 7,142,950 B2    11/2006    Rasmussen et al.
2012/0007429 A1    1/2012    Hantschel
(Continued)

FOREIGN PATENT DOCUMENTS

JP    2000184622 A    6/2000
JP    2000209872 A    7/2000
(Continued)

OTHER PUBLICATIONS

William E. Brumsickle et al, "Dynamic Sag Correctors: Cost-Effective Industrial Power Line Conditioning", IIIE Transactions on Industry Applications, vol. 37, No. 1, Jan./Feb. 2001, pp. 212-217.
(Continued)

*Primary Examiner* — Jung Kim
(74) *Attorney, Agent, or Firm* — Akarsh P. Belagodu

(57) ABSTRACT

The present invention relates to a circuit arrangement for mitigating power quality issues. It offers protection to sensitive devices against, for example, voltage sags and swells. The system introduces, for loads connected to an AC power source (e.g. a TV in a home connected to the power grid) a DC power source coupled to a controllable inverter and a controllable switching mechanism. By switching to a series configuration, the DC power source (e.g. a photovoltaic power source) can either draw or supply power in order to mitigate a power quality issue. In normal operation, by switching to a parallel configuration the DC power source can feed the load.

9 Claims, 7 Drawing Sheets

(51) Int. Cl.
*H02J 3/38* (2006.01)
*H02J 1/00* (2006.01)
*H02J 3/06* (2006.01)
*H02M 7/5387* (2007.01)

(52) U.S. Cl.
CPC ............... *H02J 3/38* (2013.01); *H02J 3/383* (2013.01); *H02M 7/5387* (2013.01); *Y02B 10/14* (2013.01)

(56) References Cited

U.S. PATENT DOCUMENTS

| | | | |
|---|---|---|---|
| 2012/0087048 A1 | 4/2012 | Yin | |
| 2014/0368143 A1* | 12/2014 | Breitzmann | H02P 3/22 318/400.22 |
| 2016/0211765 A1* | 7/2016 | Han | H02M 7/42 |

FOREIGN PATENT DOCUMENTS

| | | |
|---|---|---|
| JP | 2005210774 A | 8/2005 |
| JP | 2005354756 A | 12/2005 |
| WO | 2011108412 A1 | 9/2011 |

OTHER PUBLICATIONS

Mihai Ciobotaru et al, "A New Single-Phase PLL Structure Based on Second Order Generalized Integrator", Aalborg University, Institute of Energy Technology, Pontoppidanstraede 101, 9220 Aalborg, Denmark.

* cited by examiner

POWER QUALITY ISSUE MITIGATION THROUGH HYBRID GRID

CROSS-REFERENCE TO PRIOR APPLICATIONS

This application is the U.S. National Phase application under 35 U.S.C. §371 of International Application No. PCT/IB2013/060241, filed on Nov. 19, 2013, which claims the benefit India Patent Application No. 5048/CHE/2012, filed on Dec. 4, 2012. These applications are hereby incorporated by reference herein.

FIELD OF THE INVENTION

The present invention relates generally to the field of power distribution, and more particularly to circuit arrangements for mitigating power quality issues.

BACKGROUND OF THE INVENTION

The life and operation of sensitive loads, such as devices containing LED luminaires, are negatively affected by power quality issues such as sag, swell, flicker, etc. Auxiliary power systems, such as a standby generator, can mitigate the impact of power interruptions, but do not resolve power quality issues. Uninterruptable power supply (UPS) systems can mitigate power quality issues, but have several drawbacks. As an example, a UPS system such as disclosed in U.S. Pat. No. 7,142,950 has no added value when there are no power issues. As another example, UPS systems are typically arranged for mitigating power interruptions and are therefore over dimensioned for mitigating power quality issues.

SUMMARY OF THE INVENTION

It is an object of the present invention to provide an improved circuit arrangement for connecting power sources to a load. The object of the invention is achieved through the introduction of a circuit arrangement comprising a controllable switching mechanism arranged to switch between a parallel configuration and a series configuration. The controllable switching mechanism is arranged for coupling the load to a first power supply input and a second power supply input. In a parallel configuration the first power supply input and the second power supply input are coupled to the load in parallel; both the power supplied through the first power supply input and the power supplied through the second power supply input can feed the load. In a series configuration the first power supply input and the second power supply input are coupled to the load in series; the power supplied through the second power supply input can compensate for power quality issues in the power supplied through the first power supply input. The controllable switching mechanism is controlled through a controller. The controller can determine a power quality parameter and control the controllable switching mechanism based on this power quality parameter.

In an embodiment of the circuit arrangement according to the invention the controller is arranged to detect two of the most common power issues: voltage sag and/or voltage swell. The power quality parameter is determined based on detecting this voltage sag and/or swell in the power supplied through the first power supply input.

In a further embodiment of the circuit arrangement according to the invention the controllable switching mechanism comprises three bi-directional switches. This is beneficial as this embodiment requires few components to implement the controllable switching mechanism. The bi-directional switches are configured for connecting the first power supply input and the second power supply input in parallel when the first and second bi-directional switch are turned ON and the third bi-directional switch is turned OFF. The controllable switching mechanism is configured for connecting the second power supply input in series to the first power supply input and the load when the configuration is reversed (i.e. the first and second bi-directional switch are turned OFF and the third bi-directional switch is turned ON).

In an especially advantageous embodiment of the circuit arrangement according to the invention, the circuit arrangement further comprises a controllable inverter. The controllable inverter comprises a DC power supply input and a power supply output coupled to the second powers supply input of the controllable switching mechanism. The controller is further arranged to control the controllable inverter. The frequency and phase of the power supplied through the power supply output of the controllable inverter can be controlled based on, for example, the frequency (e.g. match the frequency, multiply the frequency) of the power and/or the current phase (e.g. in sync to inject positive voltage) of the power received through the first power supply input.

In a further embodiment of the circuit arrangement according to the invention the controllable inverter is a full bridge inverter (e.g. H-bridge inverter, single phase bridge inverter). This is beneficial as this embodiment requires few components to implement the controllable inverter.

In an embodiment of the circuit arrangement according to the invention, the controllable inverter further comprises a DC-link capacitor connected in parallel to the DC power supply input. This DC-link capacitor can deliver energy in the event the power supplied through the DC power supply input does not deliver sufficient energy (e.g. if the DC power supply input receives power from a solar panel which is receiving insufficient sunlight).

In an embodiment, a system comprises the circuit arrangement according to the invention and a DC power source. The DC power source can be selected based on power requirements related to the load (e.g. ability to independently power the load or ability limited to mitigate power issues in the power supplied by the first power supply input). The DC power source has a DC power supply output coupled to the DC power supply input of the controllable inverter.

In an especially advantageous embodiment of the system, the system comprises the circuit arrangement according to the invention and a photovoltaic power source (e.g. a solar panel) as the DC power source. This is very beneficial, as a photovoltaic power source has the ability to convert sunlight into electricity. It therefore not only aids in mitigating power quality issues, but can also deliver power under normal operation. When the controllable switching mechanism switches to a parallel configuration, the available energy of the photovoltaic power source will feed the load.

In yet another embodiment of the system, the system comprises the circuit arrangement according to the invention and a battery as the DC power source. This is beneficial as it can deliver energy when there is insufficient sunlight for a photovoltaic power source to deliver sufficient power. Furthermore, the battery can be charged under normal operation and the stored energy can be used when needed (e.g. when power is most expensive during the day or when there are power quality issues). A combination of a photovoltaic power source and a battery offers a combination of these power sources' respective advantages.

It is an object of the present invention to provide an improved method for connecting power sources to a load. The object of the invention is achieved through the introduction of a method comprising coupling the load with a controllable switching mechanism to a first and second power supply input. The controllable switching mechanism is arranged for switching between a parallel and series configuration. The method further comprises determining a power quality parameter and controlling the controllable switching mechanism based on this power quality parameter.

DETAILED DESCRIPTION OF THE FIGURES

Figure 1:
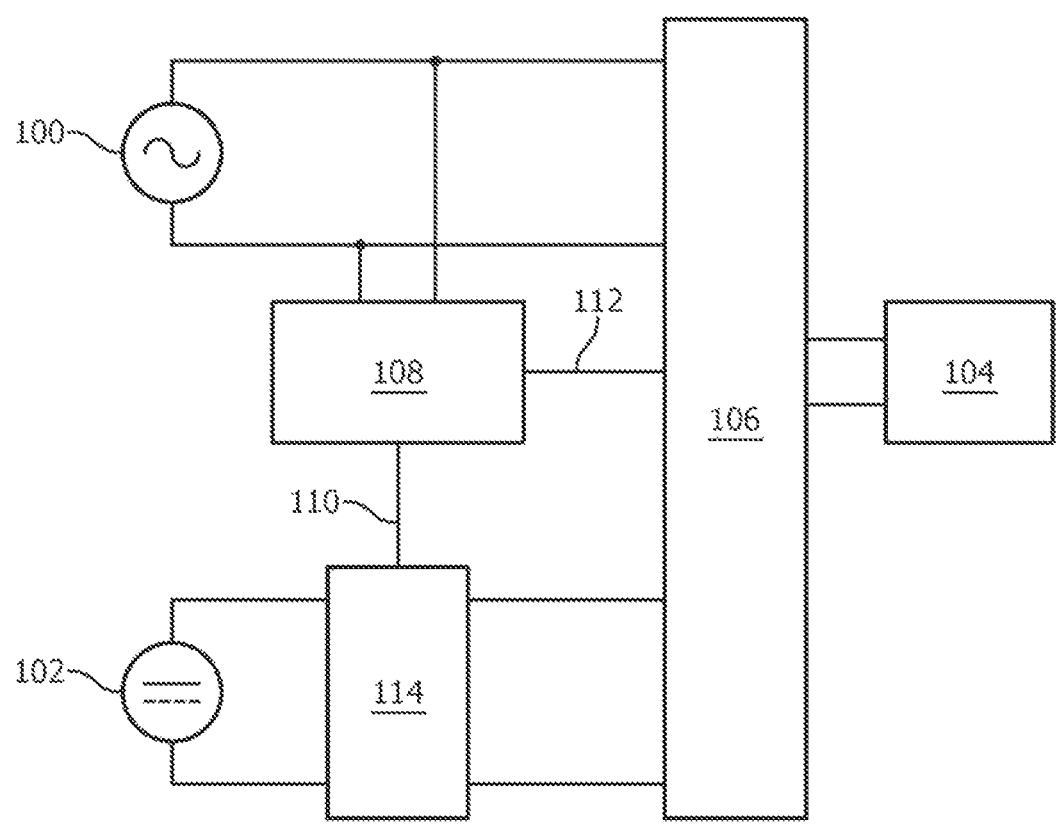
FIG. 1 shows schematically and exemplarily an embodiment of the system comprising the circuit arrangement according to the invention, comprising an AC power source and a DC power source.

In FIG. 1 an embodiment of the system comprising the circuit arrangement according to the invention is shown. The circuit arrangement mitigates power quality issues thereby protecting electronic components that are widely found in industrial equipment and residential appliances. Equipment and appliances comprising, for example, a programmable logic controller (PLC), adjustable speed drive, optical device, light emitting diode (LED) luminaire and compact fluorescent lamp (CFL) luminaire are negatively impacted by power quality issues. As an example, the lifetime expectancy of such components is negatively affected by power quality issues. As another example, operation of such components can fail as a result of power quality issues.

In FIG. 1, an AC power source 100 and a DC power source 102 are connected to a load 104 through a controllable switching mechanism 106 arranged for switching between a parallel and a series configuration. A controller 108 provides a first control signal 110 to a controllable inverter 114 and a second control signal 112 to the controllable switching mechanism 106. The controllable inverter 114 receives power from the DC power source 102 as input. The first control signal 110 controlling he controllable inverter 114 relates to the frequency, phase, voltage or current of the power supplied by the AC power source 100. The second control signal 112 controlling the controllable switching means 106 relates to connecting the controllable inverter 114 connected to the DC power source 102 in parallel to the AC power source 100 or in series between the AC power source 100 and the load 104.

As an example, the controller 108 can detect a power quality issue and set a power quality parameter corresponding to the presence of a power quality issue (e.g. $P_{pq}$='true'; where $P_{pq}$ is a power quality parameter indicating presence of a power quality issue, said parameter having a Boolean value). The controller 108, in this example, can then control the controllable switching mechanism 106 based on the power quality parameter corresponding to the presence of a power quality issue (e.g. switch to a series configuration when $P_{pq}$ has the value 'true'). Determining a power quality parameter can be based on, for example, measuring the voltage of the power provided by the AC power source, presence of voltage sag, timing of expected power quality issue, etc. Likewise, there are many implementations for controlling the controllable switching mechanism 106 based on the power quality parameter, for example, comparing the power quality parameter to a preset value (e.g. comparing to a reference voltage or comparing timing of expected power quality issue to current time). The controller 108 can include logic to determine and process multiple power quality parameters.

Figure 2:
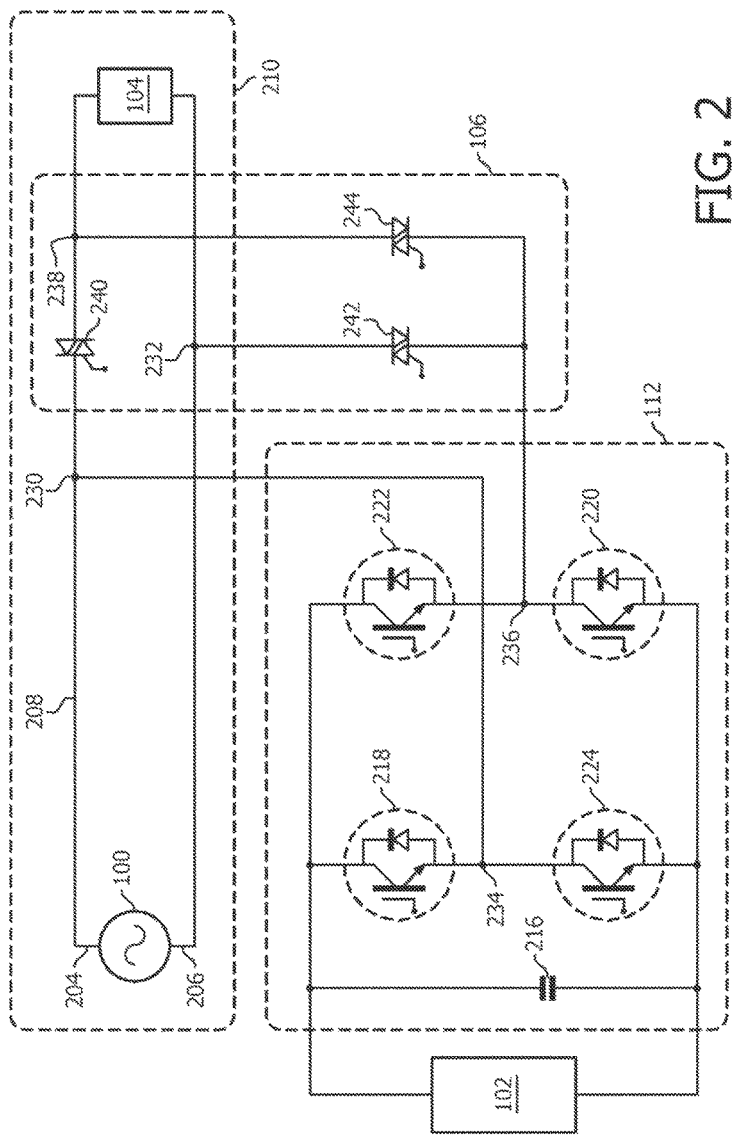
FIG. 2 shows schematically and exemplarily an embodiment of the system comprising the circuit arrangement according to the invention, comprising an AC power source and a DC power source wherein the controllable inverter comprises a full bridge inverter and wherein the controllable switching mechanism comprises three bi-directional switches.

In FIG. 2 a further embodiment of the system comprising the circuit arrangement according to the invention is shown. The circuit arrangement comprises a full bridge inverter (comprising four switches) and a controllable switching mechanism (comprising three bi-directional switches). In this figure, an AC power source 100 (where a reference number is used in multiple drawings, it refers to a common component, connection, etc.) connected to a load 104 through a mains 204 and a neutral 206 connection. A DC power source 102 (e.g. a photovoltaic power source or battery) is connected through a controllable inverter 112 to a grid 210. The controllable inverter 112 comprises a DC-link capacitor 216, a first 218, second 220, third 122 and fourth 224 switch. The controllable inverter 112 is coupled between the first 218 and fourth 224 switch to the grid 210 through a point of common coupling 230 (PCC). A neutral connection coupling 232 couples the controllable inverter 112 through a coupling 236 between the second 220 and third 222 switch to the grid 210 via a bi-directional switch 242. A mains connection coupling 238 couples the controllable inverter 112 through a coupling 236 between the second 220 and third 222 switch to the grid 210 via a bi-directional switch 244. The PCC 230 and the mains connection coupling 238 are coupled through a bi-directional switch 240.

As such the controllable inverter 112 is connected in parallel to the AC power source 100 when the first 240 and second 242 bi-directional switch are turned ON and the third 244 bi-directional switch is turned OFF. The controllable inverter 112 is connected in series between the AC power source 100 and the load 104 when the first 240 and second 242 bi-directional switch are turned OFF and the third 244 bi-directional switch is turned ON.

When connected in parallel to the AC power source 100, the DC power source 102 will feed energy to the load 104 through the controllable inverter 112. If the DC power source 102 is a photovoltaic power source, this can lower the amount of power used from the AC power source 100 and, if as an example the AC power source 100 is a power grid supplied by a utilities company, lower the energy bill. If the DC power source 102 cannot supply (sufficient) power, for example when the DC power supply 102 is a photovoltaic power source and there is insufficient sunlight, the power supplied by the AC power source 100 can feed the load.

The size of the DC-link capacitor 216 determines the duration of the time period in which power quality issues can be mitigated in the event the DC power source 102 does not deliver sufficient power. Selection of the size of the DC-link capacitor can be based on Eq. 1 below.

$$C_{DC} = \frac{P_{rated}}{2 \times \omega \times V_{DCnom} \times \Delta V_{DCmax}}; \qquad \text{Eq. 1}$$

where $P_{rated}$ is the rated power, $\omega$ is the fundamental frequency, $V_{DCnom}$ is DC-link nominal voltage and $\Delta V_{DCmax}$ is the maximum allowable ripple in DC-link voltage.

Figure 3:
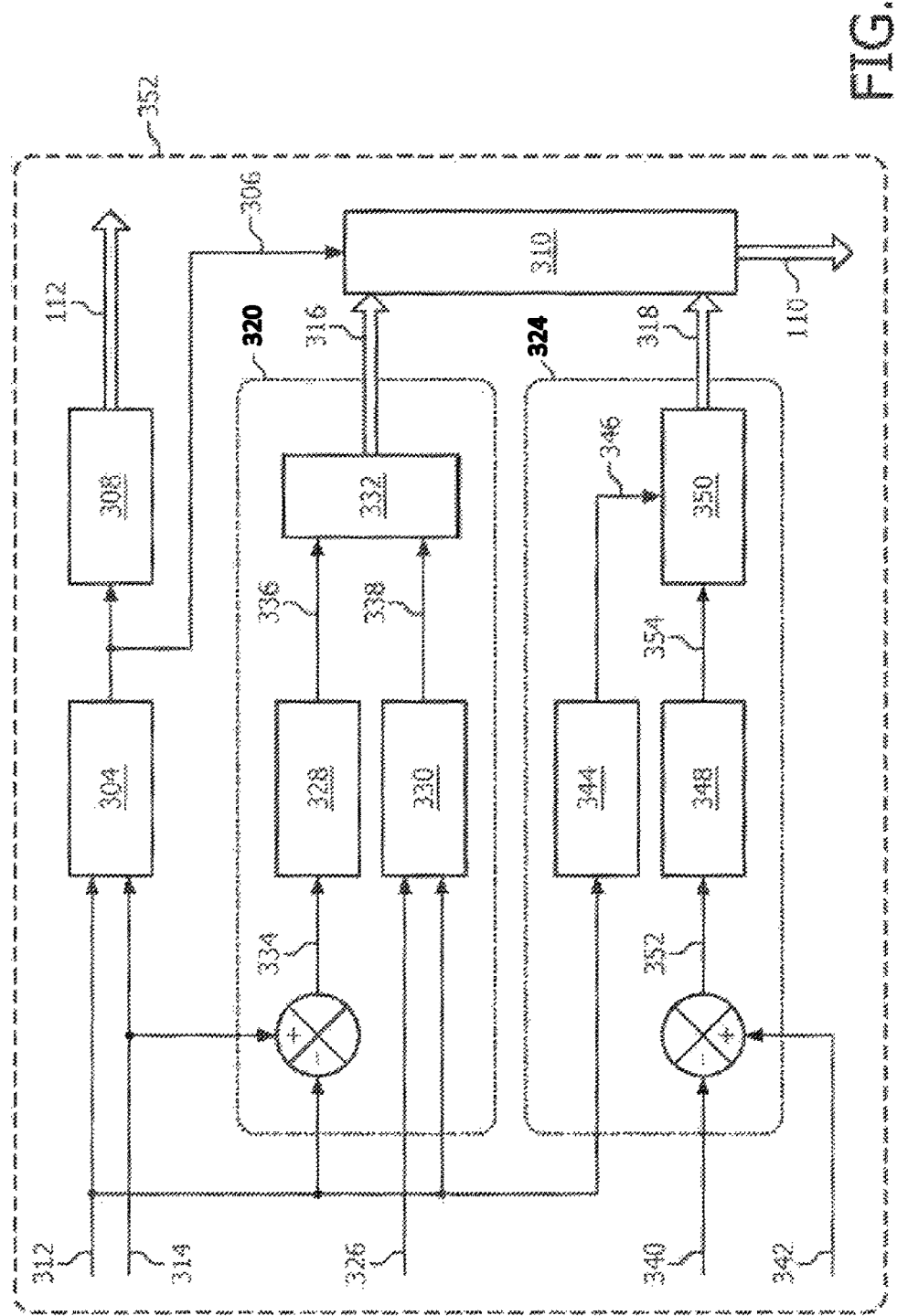
FIG. 3 shows schematically and exemplarily a controller as part of an embodiment of the circuit arrangement according to the invention.

In FIG. 3, an embodiment of the controller as part of the circuit arrangement according to the invention is shown. The controller is arranged to provide a first control signal 110 to the controllable switching mechanism 106, and a second control signal 112 to the controllable inverter 112. The first control signal 110 is generated based on a first step 304 of detecting a power quality issue (e.g. detecting a voltage sag or swell) related to the power supplied by the AC power source 100, and a second step 308 of selecting a configuration. The first step takes as input the AC voltage measured 312 ($V_{AC\_mes}$) and the AC voltage reference 314 ($V_{AC\_ref}$) and provides as output a power quality issue signal 306. Detection of a power quality issue can be based on, for example, determining the delta between $V_{AC\_mes}$ 312 and $V_{AC\_ref}$ 314. If this delta passes a predetermined threshold value, a power quality issue has been detected. Other implementations of power quality issue detection comprise the monitoring of various other inputs or the application of rule based detection.

The second step 308 of selecting a configuration takes as input the power quality issue signal 306 and provides as output a first control signal 110 to the controllable switching mechanism 106. This first control signal 110 determines the setting of the bi-directional switches 218, 220, 222, 224. The switch settings are shown in Table 1.

TABLE 1

| Bi-directional switch | No power quality issue detected (parallel configuration) | Power quality issue detected (series configuration) |
|---|---|---|
| 240 | ON | OFF |
| 242 | ON | OFF |
| 244 | OFF | ON |

A multiplexer 310 receives as inputs a series control signal 316 and a parallel control signal 318. It selects the series control signal 316 when the power quality issue signal 306 indicates that there is a power quality issue. The multiplexer selects the parallel control signal 318 when the power quality issue signal 306 indicates that there is no power quality issue. The multiplexer 310 passes on as second control signal 110 to the controllable inverter 112 either the series control signal 316 or the parallel control signal 318 based on this selection.

The series control signal 316 is generated by a series control block 320. The parallel control signal 318 is generated by a parallel control block 324. The series control block 320 takes as input signals the $V_{AC\_mes}$ 312, the $VC_{AC\_ref}$ 314 and the load current measured 326 ($I_{Load\_mes}$). The series control block 320 in a first step 328 determines the magnitude of the required voltage injection, in a second step 330 it determines the phase and both this first 328 and second 330 step provide input for a third step 332 which determines the switching pattern.

The first step 328 takes as input the time varying voltage 334 based on the $V_{AC\_mes}$ 312 and the $V_{AC\_ref}$ 314 and provides as output a signal 336 representing the magnitude of the required voltage injection. The second step 330 takes as input the $V_{AC\_mes}$ 312 and $I_{Load\_mes}$ 326 and provides as output a signal 338 representing the phase of the required voltage injection. These two signals 336, 338 are used in the third step 332 to determine the switching pattern and provide a related power width modulation (PWM) signal; this first PWM signal is the series control signal 316. The switching pattern under voltage sag and swell can be found in respectively table 2 and 3.

TABLE 2

| Input V | I current | V to be injected | Switch 218 | Switch 220 | Switch 222 | Switch 224 |
|---|---|---|---|---|---|---|
| +ve | +ve | +ve | OFF | OFF | ON | ON |
| +ve | +ve | 0 | OFF | OFF | ON | OFF |
| +ve | −ve | +ve | ON | ON | OFF | OFF |
| +ve | −ve | 0 | OFF | ON | OFF | OFF |
| −ve | −ve | −ve | ON | ON | OFF | OFF |
| −ve | −ve | 0 | OFF | ON | OFF | OFF |
| −ve | +ve | −ve | OFF | OFF | OFF | OFF |
| −ve | +ve | 0 | OFF | OFF | ON | OFF |

TABLE 3

| Input V | I current | V to be injected | Switch 218 | Switch 220 | Switch 222 | Switch 224 |
|---|---|---|---|---|---|---|
| +ve | +ve | −ve | OFF | OFF | OFF | OFF |
| +ve | +ve | 0 | OFF | OFF | OFF | ON |
| +ve | −ve | −ve | OFF | OFF | OFF | OFF |
| +ve | −ve | 0 | ON | OFF | OFF | OFF |
| −ve | −ve | +ve | OFF | OFF | OFF | OFF |
| −ve | −ve | 0 | ON | OFF | OFF | OFF |
| −ve | +ve | +ve | OFF | OFF | ON | ON |
| −ve | +ve | 0 | OFF | OFF | OFF | ON |

The parallel control signal 318 is generated by a parallel control block 324. The parallel control block 324 takes as input signals the $V_{AC\_mes}$ 312, the DC voltage measured 340 ($V_{DC\_mes}$) and the DC voltage reference 342 ($V_{DC\_ref}$). The parallel control block 324 in a first step 344 creates a phase locked loop signal 346, in a second step 348 the PI compensation is determined and in a third step 350 a PWM signal is generated. The first step 344 takes as input the $V_{AC\_mes}$ 312 and provides as output a phase locked loop signal 346. The second step 346 takes as input the time varying voltage 352 based on $V_{DC\_mes}$ 340 and the $V_{DC\_ref}$ 342 and provides as output a signal 354 representing the required switching frequency of the inverter in relation to the inverter providing as output voltage the $V_{DC\_ref}$. In the third step the PWM signal is generated in order to apply the DC-link voltage in the proper phase and magnitude; this second PWM signal is the parallel control signal 318.

Figure 4:
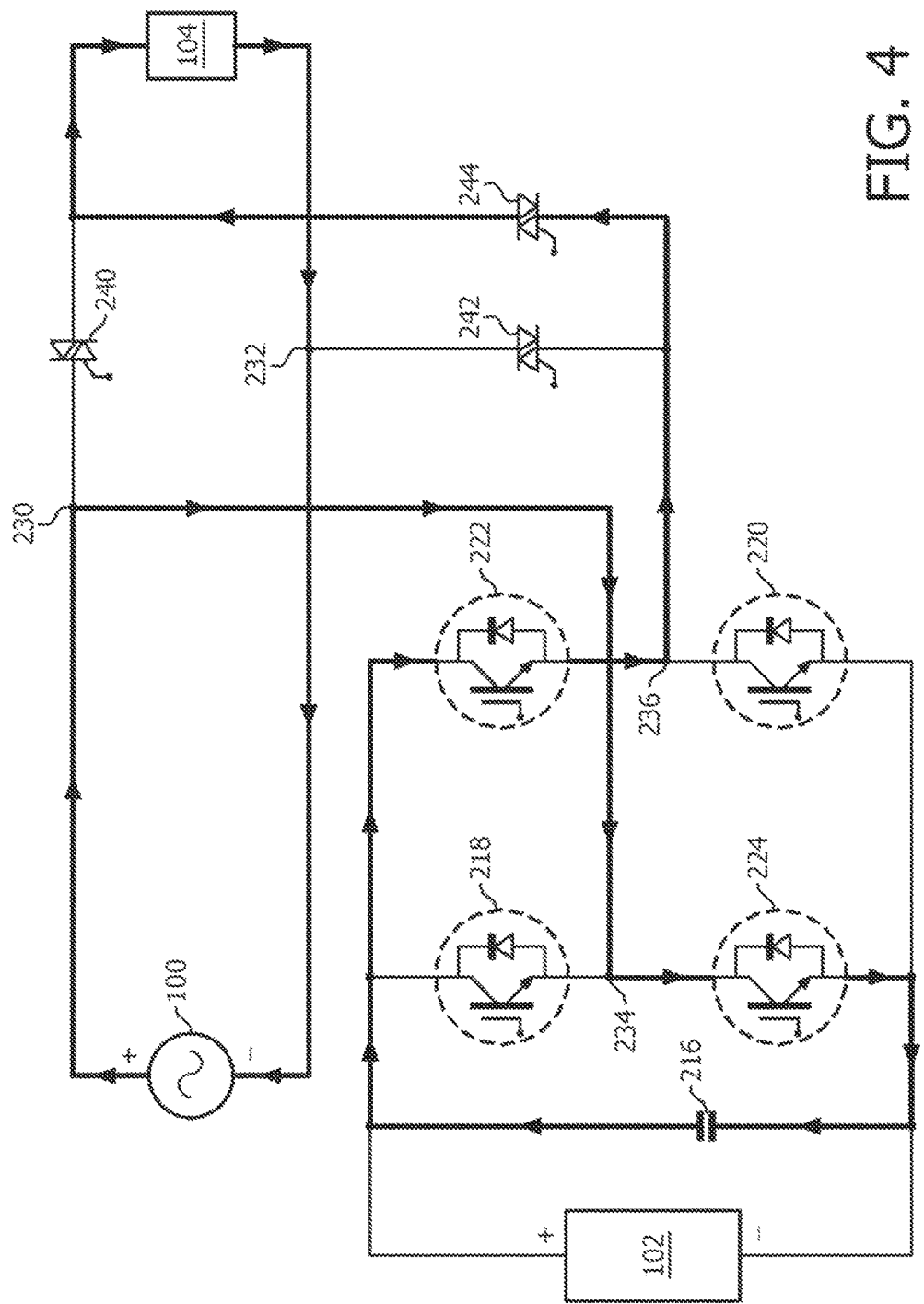
FIG. 4 shows schematically and exemplarily a simplified version of FIG. 2, in a series configuration with an indication of the negative cycle of the first power supply, wherein the inverter is injecting voltage.
Figure 5:
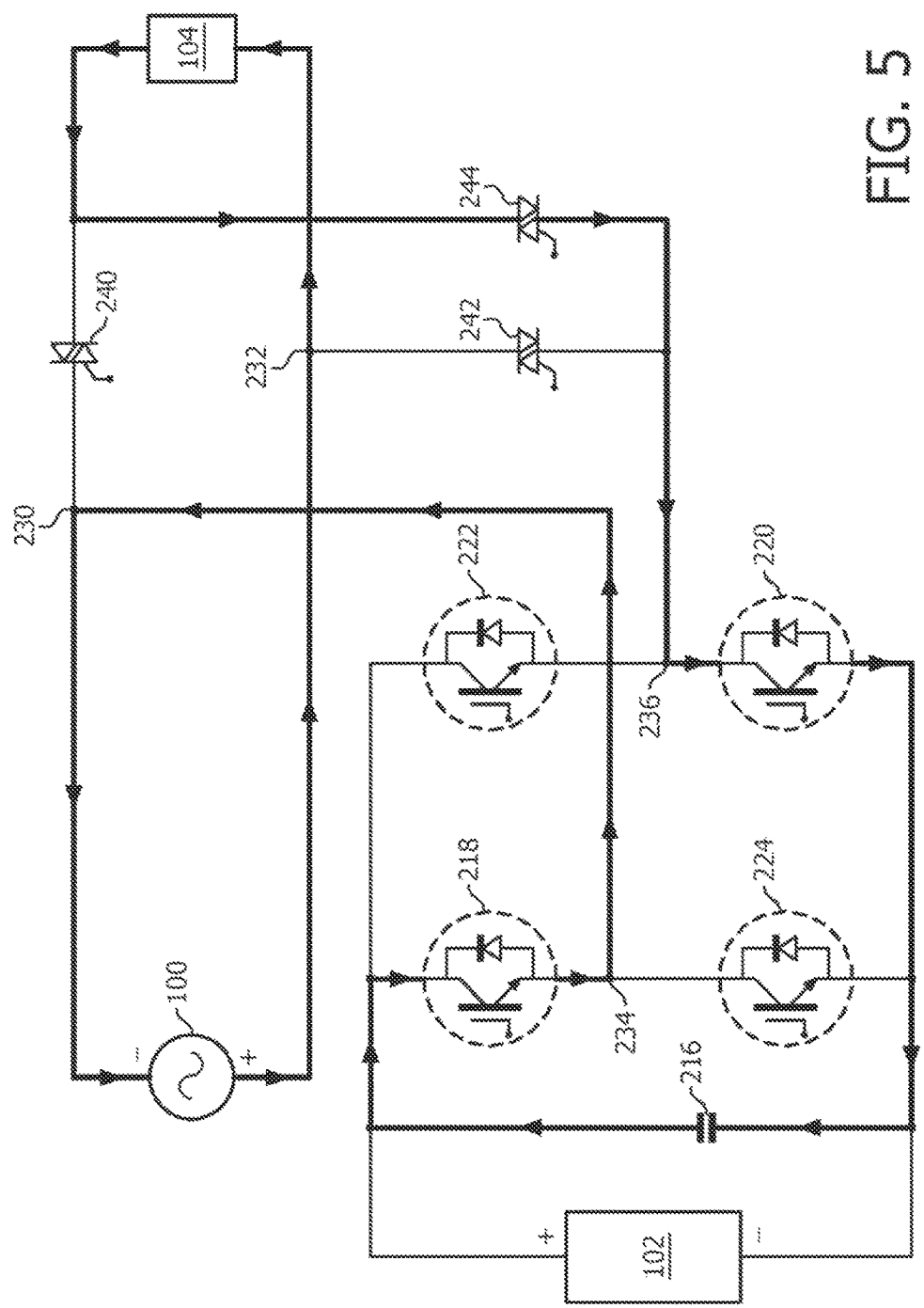
FIG. 5 shows schematically and exemplarily a simplified version of FIG. 2, in a series configuration with an indication of the positive cycle of the first power supply, wherein the inverter is injecting voltage.

In FIG. 4 and FIG. 5 a simplified version of FIG. 2 is shown, in a series configuration (bi-directional switch 240 and 242 OFF; 244 ON) with an indication of the current flow in the circuit arrangement during respectively the positive cycle and negative cycle of the power supplied by the first power source, wherein the second power source is injecting voltage. Under voltage sag, in the series configuration, the controllable inverter can inject voltage (V to be injected; table 2) to mitigate the voltage sag.

Figure 6:
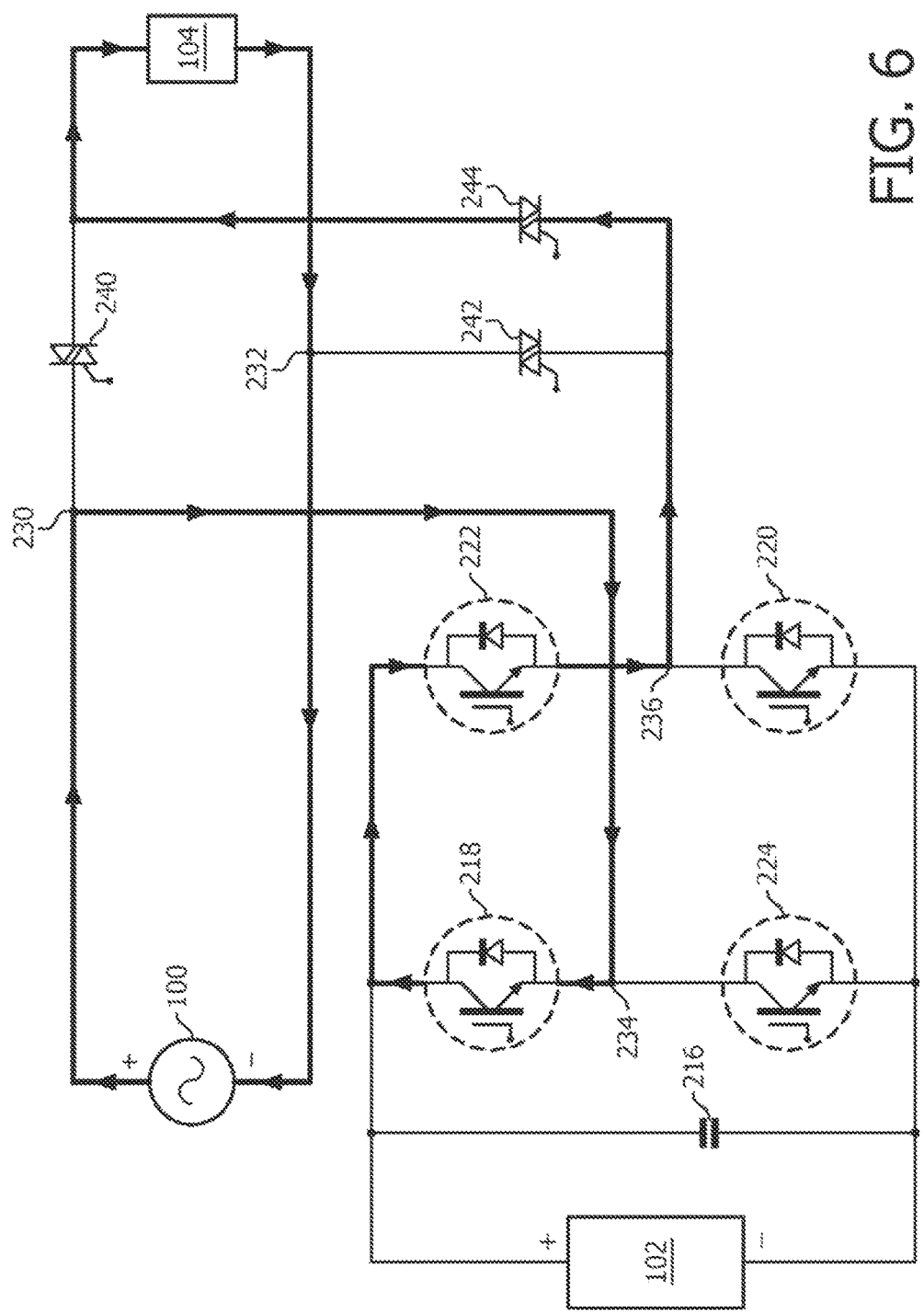
FIG. 6 shows schematically and exemplarily a simplified version of FIG. 2, in a series configuration with an indication of the positive cycle of the first power supply, wherein the inverter is not injecting voltage.
Figure 7:
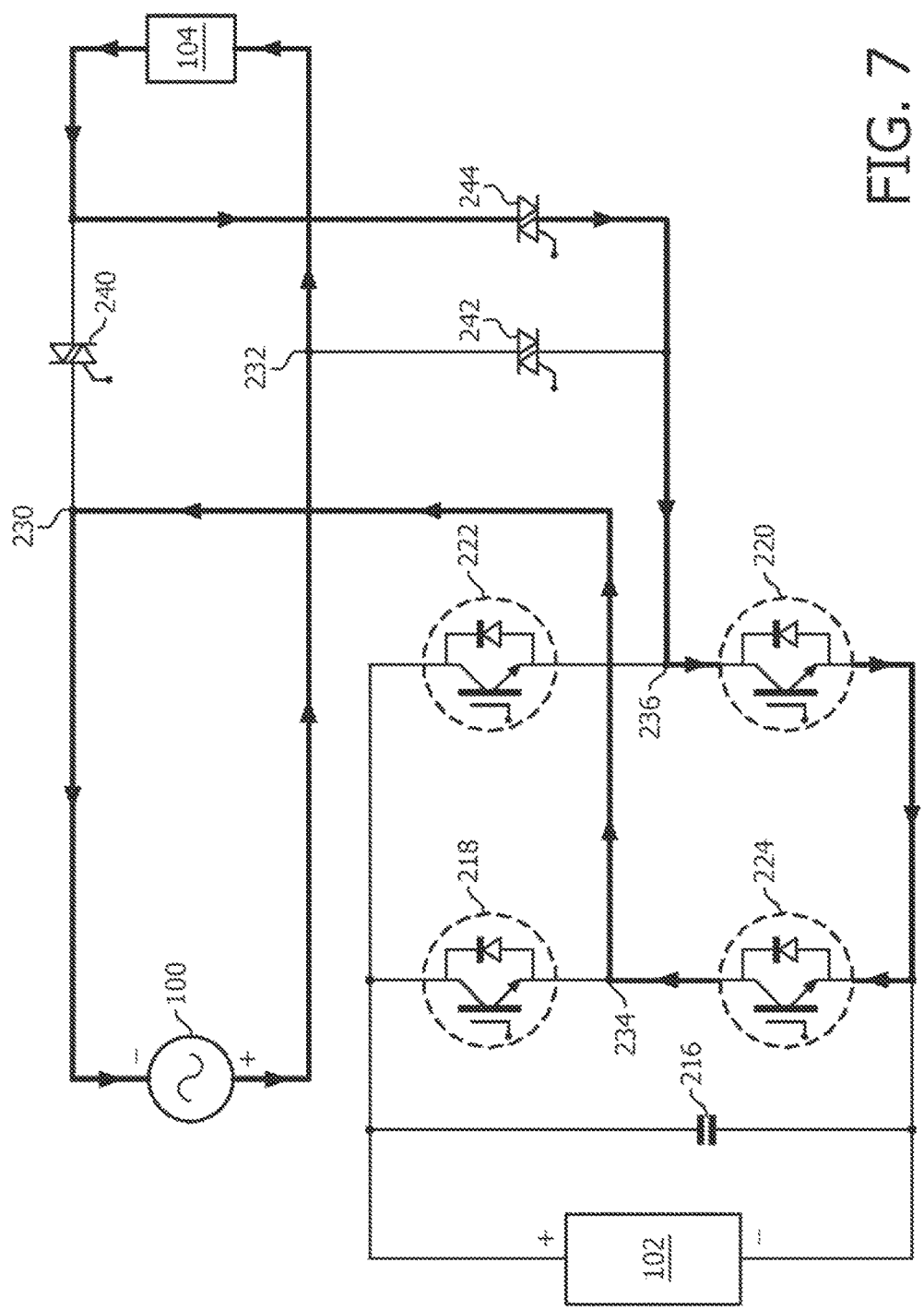
FIG. 7 shows schematically and exemplarily a simplified version of FIG. 2, in a series configuration with an indication of the negative cycle of the first power supply, wherein the inverter is not injecting voltage.

In FIG. 6 and FIG. 7 a simplified version of FIG. 2 is shown, in a series configuration with an indication of the current flow in the circuit arrangement during of respectively the positive cycle and negative cycle of the power supplied by the first power source, wherein the second power source is not injecting voltage. The magnitude of the voltage injected in a series configuration under voltage sag can be controlled, for example, by the controllable inverter switching between injecting voltage (FIG. 4 for the positive cycle, FIG. 5 for the negative cycle) and not injecting voltage (FIG. 6 for the positive cycle, FIG. 7 for the negative cycle) until the desired magnitude of voltage to be injected has been reached.

Not shown is a series configuration in relation to the presence of other power issues (e.g. voltage swell), nor a parallel configuration.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names. No specific sequence of acts is intended to be required unless specifically indicated.

The invention claimed is:

1. A circuit arrangement for connecting power sources to a load, the circuit arrangement comprising:
    a controllable switching mechanism, arranged for coupling the load to a first power supply input and a second power supply input, the controllable switching mechanism being arranged for switching between a parallel and a series configuration,
    a controller arranged to determine a power quality parameter and control the controllable switching mechanism based on the power quality parameter; and
    a controllable inverter;
    wherein the controllable inverter comprises a DC power supply input and a power supply output coupled to the second power supply input of the controllable switching mechanism; and
    wherein the controller is further arranged to control the controllable inverter.

2. The circuit arrangement of claim 1, wherein the power quality parameter is based on detection of the presence of voltage sag or voltage swell in the power received through the first power supply input.

3. The circuit arrangement of claim 1, wherein the controllable switching mechanism comprises three bi-directional switches.

4. The circuit arrangement of claim 3, wherein the controllable inverter is a full bridge inverter.

5. The circuit arrangement of claim 3, wherein the controllable inverter further comprises a DC-link capacitor.

6. A system comprising the circuit arrangement of claim 3, further comprising a DC power source having a DC power supply output coupled to the DC power supply input of the controllable inverter.

7. The system of claim 6, wherein the DC power source comprises a photovoltaic power source.

8. The system of claim 6, wherein the DC power source comprises a battery.

9. A method of connecting power sources to a load, the method comprising:
    coupling the load with a controllable switching mechanism to a first power supply input and a second power supply input, wherein the controllable switching mechanism is arranged for switching between a parallel and a series configuration;
    determining a power quality parameter,
    controlling, based on the power quality parameter, the controllable switching mechanism and a controllable inverter,
    wherein the controllable inverter comprises a DC power supply input and a power supply output coupled to the second power supply input of the controllable switching mechanism.

* * * * *